(No Model.)

M. LEVY.
APPARATUS FOR REGULATING THE TRANSMISSION OF ELECTRIC FORCE.

No. 273,291. Patented Mar. 6, 1883.

Fig. 2.

Witnesses:
E. E. Masson
C. J. Hedrick

Inventor:
Maurice Lévy by
A. Pollok
his attorney.

(No Model.) 7 Sheets—Sheet 6.

M. LEVY.
APPARATUS FOR REGULATING THE TRANSMISSION OF ELECTRIC FORCE.
No. 273,291. Patented Mar. 6, 1883.

Witnesses:
E. E. Masson
C. J. Hedrick

Inventor:
Maurice Levy by
A. Pollok
his attorney.

UNITED STATES PATENT OFFICE.

MAURICE LEVY, OF PARIS, FRANCE.

APPARATUS FOR REGULATING THE TRANSMISSION OF ELECTRIC FORCE.

SPECIFICATION forming part of Letters Patent No. 273,291, dated March 6, 1883.

Application filed February 18, 1882. (No model.)

*To all whom it may concern:*

Be it known that I, MAURICE LEVY, of Paris, in the Republic of France, have invented a new and useful Improvement in Regulating the Transmission of Electric Force, which is fully set forth in the following specification.

This invention has for its object more particularly to maintain a uniform current of electricity through the translating devices upon a circuit or the branches thereof, whatever may be the number of translating devices (motors, lights, heaters, &c.) in circuit, and it may be used in systems wherein the said devices are placed in the same main line, and also in systems wherein they are placed in derived branches.

It is well known that the strength or intensity of an electric current traversing a circuit depends upon two things: first, the electro-motive force of the source of electricity, or the difference in potential maintained between the ends of the circuit by the generator of electricity; and, second, upon the resistance of the circuit, the strength or intensity being proportionate directly to the first and inversely to the second. It is evident, therefore, that the strength or intensity of the current will be varied by variations in the electro-motive force of the source or in the resistance of the circuit. If the source of electricity is a galvanic battery, the electro-motive force may be varied by connecting a greater or less number of cells in series or tension. If the source of electricity is a generator or set of generators operated by power—that is, mechanically—not only may the electro-motive force be varied by connecting a greater or less number of the electrical machines in series or tension, but also by increasing or diminishing the speed of the generator or generators, and in case the latter operate by induction from field-magnets, by strengthening or weakening the inductors or field-magnets. The resistance of a circuit may be altered by varying either the length or conductivity of the wires composing the same. These are all well-known ways of controlling the current, and to carry out the same, means of various kinds have been adopted. Thus, for varying the electro-motive force of a source of electricity in the case of batteries, the poles of the several cells have been connected with a commutator the operation of which switches in the different cells, as required. Similarly commutators have been employed for switching other generators into and out of the circuit, and they have in like manner been combined with rheostats or resistances. With electrical machines mechanical couplings have also been used, in order that they may be connected with the prime motor or disconnected therefrom at will, so that the number running may be increased or diminished to satisfy or conform to the demand. The speed of electrical machines has been controlled by the use of means forming part of the prime motor that drives said electrical machines, and commonly employed to control the speed of such motor—as, for example, the throttle-valve and cut-off apparatus of a steam-engine.

The inductors of electrical machines, when said inductors are electro-magnets, have been made stronger or weaker by varying the current in the coils of the magnet, or by causing the current to circulate through a greater or less number of coils. In the latter case commutators have been employed to switch in or out the coils; in the former case rheostats or resistances have been used to vary the current through the coils.

Apparatus other than those mentioned, and operating otherwise than in the modes particularly indicated, have been used to vary the electro-motive force of a generator or set of generators or the resistance of a circuit. All, however, may be classed under the general head of current-controlling means, and all resemble one another in having some movable device—such as a shaft, a lever, a slide, or the like—which is combined with the commutator, the valve, or the other like elements of the apparatus, and the movement of which, in one direction or the other, effects the desired alterations in the electrical conditions. The said class, however, besides the apparatus strictly for varying the electro-motive force of a generator or the resistance in a circuit, includes also the apparatus for keeping the same up to the proper limit. For example, to send a given current through a given resistance, a certain amount of work must be performed, either in the form of chemical action by the galvanic battery or by the power expended in driving the electrical machine, and there must be a capacity in the battery, or in the prime motor which drives the machine, to do the work. Apparatus which gives this capacity by changing the active surface in the galvanic battery or the power of the prime motor, although they may not directly change either the electro-motive force of the generator or resistance of the circuit, are current-controlling means.

Thus far nothing new has been described.

The present invention consists, first, in the combination, with current-controlling means, of an electrical motor having its armature-shaft connected with said means, and of counterbalancing mechanism acting in opposition to said motor. The counterbalancing mechanism is so adjusted that the armature-shaft is *in equilibrio* so long as a current of the normal strength traverses the motor, but is turned in one direction or the other as the current becomes weaker or stronger. By placing a motor in a circuit the current of which is regulated by the current-controlling means connected with the armature shaft thereof it is obvious that the variations in the current will—the said means being suitably disposed—operate the same so as to correct said variations, and the current will be maintained uniform by the automatic action of the apparatus. The motor and the counterbalancing mechanism are preferably so constructed and arranged that with a normal current the armature-shaft is *in equilibrio* in all positions of the armature-shaft, or of the current-controlling means operated thereby. The counterbalancing mechanism may consist of a weight fastened to a cord that is wound upon a drum fixed on the armature-shaft of the motor, but is preferably an electric motor having its armature carried by the armature-shaft of the first motor. Both forms are herein shown.

The invention secondly consists in the arrangement, on a new principle, of circuits and generators, when the latter comprise one or more electrical machines having electro-magnets for inductors, so that the current in the translating device will be maintained uniform, notwithstanding the introduction or removal of other devices, and this without change in the speed of the motor, or with a change only within narrow limits. In electric circuits for conveying power and light to a number of points there are ordinarily or invariably certain resistances which are constant—such as the resistance of the generator or generators, and of the conductors always in circuit—and certain resistances which are variable—such as the resistance of the translating devices and of the conductors immediately connected therewith—and in like manner the electro-motive force required to maintain the current through each translating device uniform, notwithstanding the connection or disconnection of other translating devices, may be divided into a constant and a variable electro-motive force. A generator of constant electro-motive force can be obtained by the use of a galvanic battery, a magneto-electric machine excited by permanent magnets, or by electro-magnets when the current in the coils of the latter is constant. Generators with electro-magnets as inductors, so long as the said magnets are not near the point of saturation, maintain, with a constant speed, an electro-motive force which is approximately in direct proportion to the current circulating in the coils of the inducing-magnets. By combining, therefore, a generator of proper constant electro-motive force with a proper generator, which is an electrical machine excited by electro-magnets, the desired conditions can be obtained without alteration in the speed of the generator or generators by having the current through the coils of the electro-magnet bear a fixed ratio to the variable electro-motive force. This second portion of the invention accomplishes the desired result by exciting the inducing electro-magnets in a portion of the circuit in which the current varies with the number of translating devices in operation, and in consequence of the introduction into or removal from the circuit of the said devices. For example, assuming the translating devices to be connected in derivation or multiple arc, it is obvious that the current in that part of the circuit which is common to all the translating devices equals the sum of the currents through the latter; or, in other words, its quantity or intensity is in proportion to the number of translating devices in operation. By exciting the generator of variable electro-motive force in said common portion of the circuit its electro-motive force will vary in the correct ratio. The circuit being closed, the completion of the circuit through the other translating devices lessens the resistance of the circuit as a whole, and the speed of the generators being maintained the current therefore increases, and by its increase increases also the electro-motive force of the generator excited thereby until normal operation under the new conditions is attained. If, on the other hand, the translating devices are arranged in series or in tension, it is obvious that the current in a branch or shunt connecting the direct with the return wire of the circuit will increase or diminish as the number of translating devices in the main circuit increases or diminishes, and the electro-motive force of the generator excited in said branch or shunt correspondingly varies. More than two generators can be employed, or one only can be used, provided it is adapted properly to vary in electro-motive force—for example, if its magnets have two coils, in one of which the current is maintained uniform, while in the other it varies in proper ratio.

The invention further comprises certain special arrangements and combinations of generators, regulators, commutators, and resistances, as hereinafter more particularly specified.

The accompanying drawings, which form a part of this specification, illustrate the manner in which the invention and its several parts are or may be carried into effect.

Figure 1:
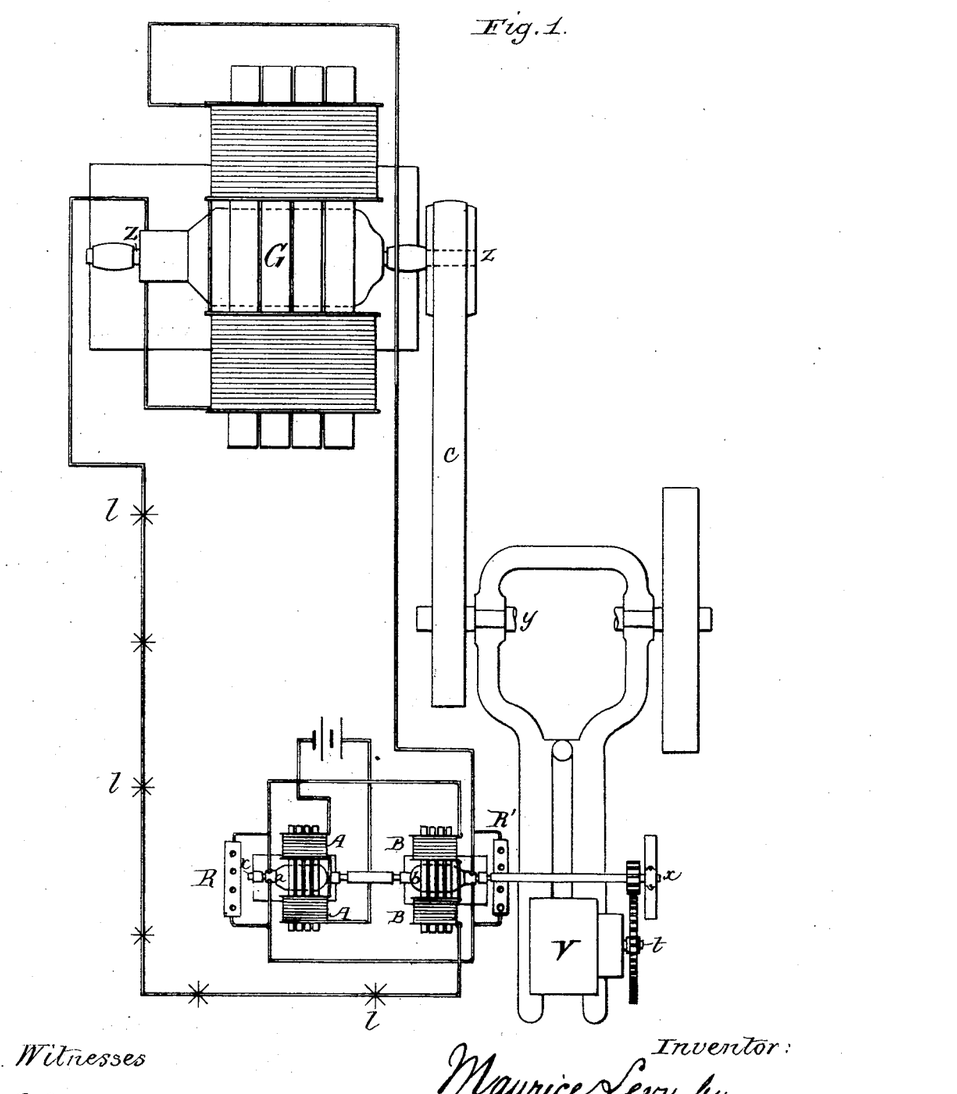
Figures 1, 2, and 3 are plan views of lighting systems provided with automatic regulators or current-governors constructed in accordance with the invention, a somewhat different form of said regulator or governor being shown in each figure.
Figure 2:
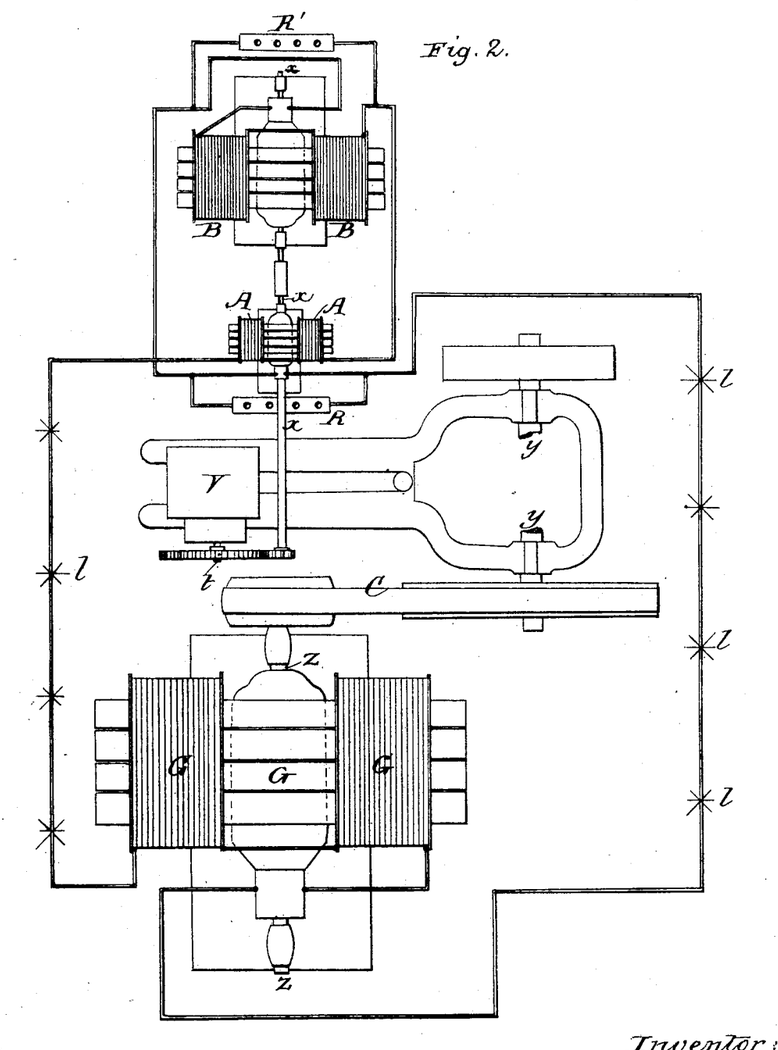
Figure 3:
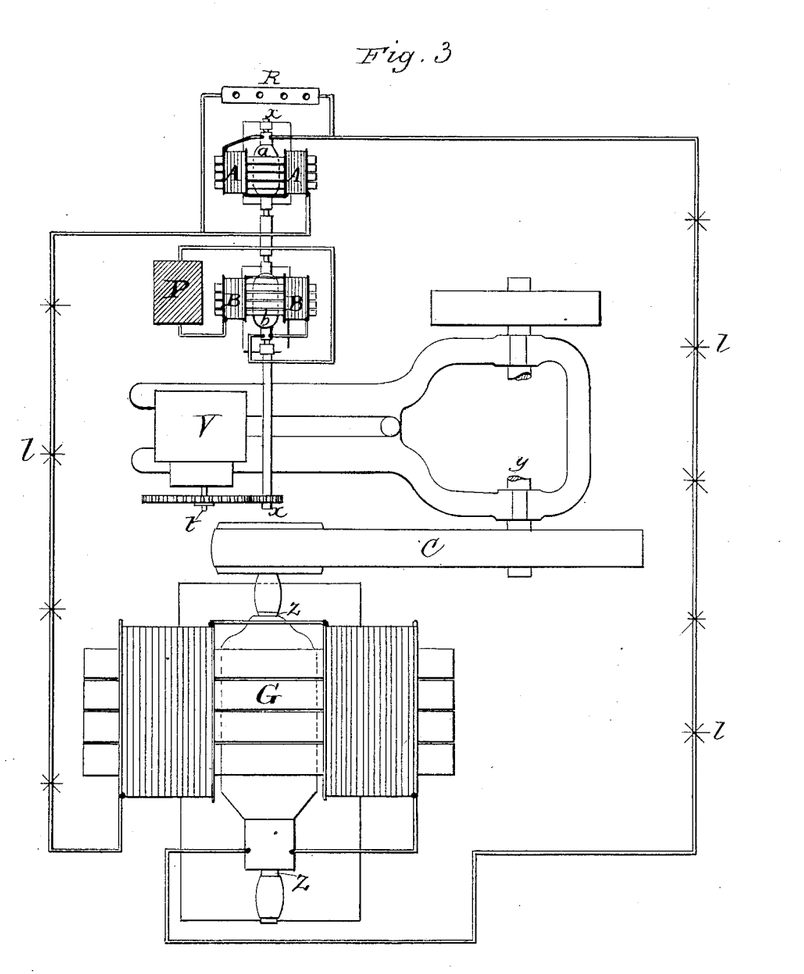

The current-regulator shown in Figs. 1, 2, and 3 consists of an electric motor, A, and a counterbalancing-motor, B, having their shaft-armatures $a$ and $b$ fixed on a common shaft, $x$, which is geared to the shaft $t$, and through the latter operates to control the admission of steam to the cylinder V of an engine or pressure-motor which drives the dynamo-electric machine G. The shaft $t$ is connected with the valve in the steam-chest attached to the cylinder V, or with the cut-off apparatus, or with other appropriate device or devices. The power-shaft $y$ of said prime motor (which may be a hydraulic, gas, or air engine or other suitable machine, as well as a steam-engine) is connected with the armature-shaft $z$ of the dynamo-electric machine by a belt, C, running on pulleys keyed to said shafts. The circuit of the dynamo-electric machine includes the lights $l$, or other translating devices, and also the automatic regulator or current-governor.

As shown in Fig. 1, the motor A has for its field-magnet an electro-magnet excited from an outside source, while its armature is included in the circuit. A permanent magnet could be used instead of an electro-magnet.

The counterbalancing-motor B has not only its armature $b$, but also its field-magnets, included in the circuit. Shunts R R', of graduated resistance, cause a part only of the currents to pass through the armatures $a$ and $b$. The current can be regulated at the proper point by adjusting the resistances R R'. The armatures of the two motors are arranged to act in opposition—that is to say, the current tends to cause a revolution of armature $a$ in one direction and of the armature $b$ in the opposite direction, and the motors and resistances R R' are so adjusted that under the influence of a current of the normal strength, which it is desired to maintain uniform, each counteracts the power of the other, and the shaft $x$ remains stationary or *in equilibrio*. Since the two motors are affected to different extents by the current, (the motor B being dependent upon the current for the excitation of its field-magnets, while the motor A is independent of the current in this respect,) it is obvious that with any increase or decrease in the strength of said current the one motor, B, will gain or lose in strength faster than the other, A, and will overpower it and turn the shaft $x$ in one direction, or will be overpowered by it and allow said shaft to be turned in the opposite direction. The revolution of the shaft $x$, as already stated, controls the admission of steam into the cylinder V, and causes the speed of the motor, and consequently of the armature of the generator G, to become faster or slower until the current again attains its normal strength, when the said shaft $x$ is once more *in equilibrio*. It should be observed that equilibrium is established equally well in all positions of the shaft $x$, and of the valve or other device or devices controlled thereby.

As shown in Fig. 2, the motor A has its armature shunted by the graduated resistance R and its field-magnets excited by the full strength of the current, so that they are nearly saturated, while the larger motor, B, has its field-magnets, as well as its armature, traversed by a portion only of the current, both field-magnets and armature being shunted by the graduated resistance R'. The motors have their armatures arranged in opposition, and they and the resistances R R' are adjusted so as each to counterbalance the other. The motor B, having its field farther from the point of saturation, is consequently more sensitive to variations in the current than the motor A. If the current increases, it gains strength more rapidly than the latter, overpowers it, turns the shafts $x$ and $t$, cuts off steam (or other motor fluid if a different kind of energy be used) from the prime motor, and causes the speed of generator G to slacken until the current resumes its normal strength. If the current falls below the normal, the reverse operations take place.

As shown in Fig. 3, the motor A is alone connected in circuit, the motor B being excited by the current from one or more cells of galvanic battery or other constant generator P. The motors are adjusted to be *in equilibrio* when the current is normal. An increase causes the motor A to overpower the motor B, and a decrease causes it to be overpowered thereby, with the result of a slackening in the speed of the generator G in the former case and an acceleration in the latter.

Figure 4:
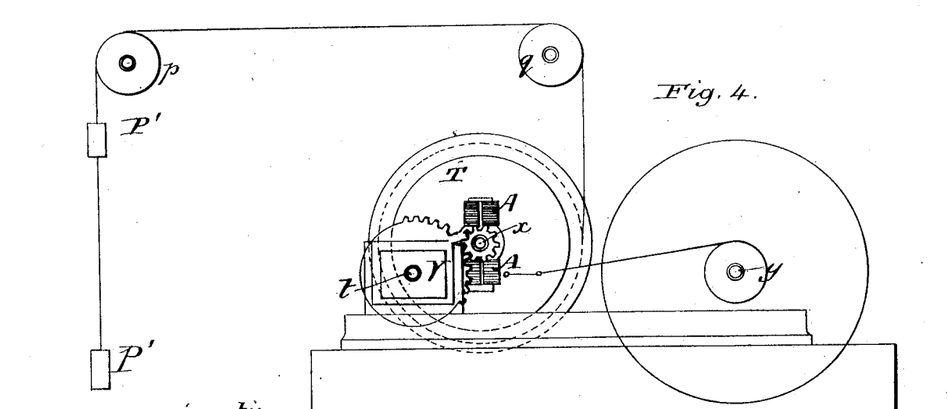
Figs. 4 and 4$^{bis}$, an elevation and a plan, respectively, of a lighting system provided with a fourth form of regulating means.

As shown in Figs. 4 and 4$^{bis}$, the motor B is replaced by a counterpoise, P', attached to a cord that is wrapped around the drum T, fixed on the shaft $x$. The cord between the drum T and the counterbalancing-weight P' is supported on pulleys $p$ $q$. The strength of motor A is adjusted by regulating the resistance R until the current through the motor just suffices to balance the weight P', when the current on the circuit is of normal strength. A decrease in said strength allows the weight P' to turn the shafts $x$ $t$ and increase the supply of steam to the engine, while an increase in the strength of current is attended with a contrary result. In either case the shaft $x$ comes to rest when the normal working is resumed.

Figure 5:
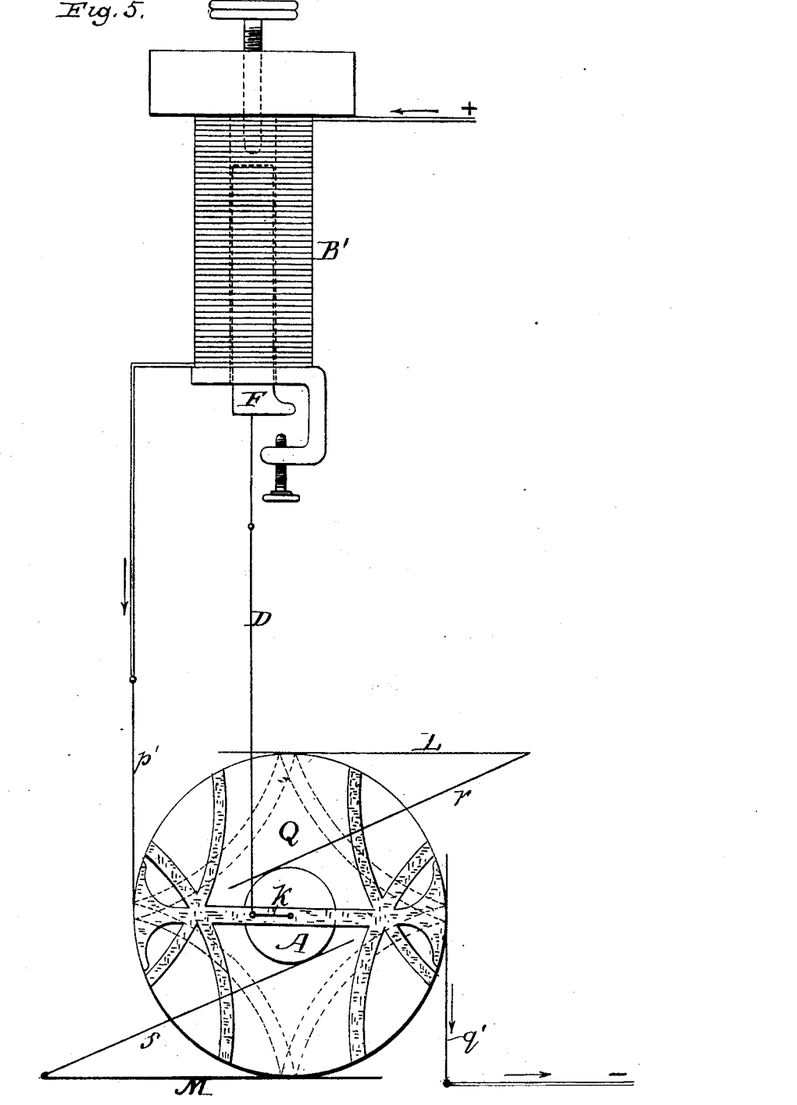
Fig. 5, an elevation of a fifth form of regulator.

As shown in Fig. 5, a solenoid or hollow electro-magnet, B', connected in the circuit to be regulated, controls the position of a commutator, Q, which is so constructed that it cuts out or connects in circuit a motor, A, according to its position. Normally it cuts out the motor; but when the current becomes abnormal it includes the motor in circuit and causes the current to traverse it in the one direction or the other, as the said current is above or below the standard. Of course the motor turns to the right or left, according to the direction of the current through its coils. The armature-shaft is connected with the steam-valve, as in the other figures, and the motor therefore increases or diminishes the supply of steam to the engine, according to the exigences of the occasion.

In the drawings the shaded portions of the commutator are of metal, the unshaded portions of insulating material. The dotted lines indicate the position of the metal portions when the commutator is shifted. $p'$ and $q'$ are the brushes connected with the two poles of the circuit, or line in and line out. The movable core F of the solenoid or electro-magnet B' is connected by the jointed rod D with a crank-arm, K, attached to the commutator. Besides the brushes or collectors $p'$ and $q'$, brushes L and M, which are electrically connected with the commutator-brushes $r\ s$ of the motor A, or with the poles of said motor, bear against the commutator. Normally the apparatus remains in the position shown in full lines, the brushes L M resting upon the insulated portion of the commutator. When the current increases it lifts the core F, turns the commutator to the right, and completes the circuit from the brush $p'$ to the brush L; thence through the motor A, brush M, and commutator to the brush $q'$. When the current diminishes the core F drops by its own weight and turns the commutator to the left and completes the circuit through the motor A from the brush M. Adjustable stops limit the play of the core F. When the commutator Q is turned so as to connect in the motor the direct connection through the commutator is not broken, but remains intact. The whole current does not therefore pass through the motor, but a portion is diverted and passes through it. The proportion of current diverted depends upon the relative resistance of the direct connection through the commutator and the shunt through the motor; but as a small part only of the total current is required to work the motor the resistance through the commutator may be much less than the other.

In Figs. 1 to 4$^{bis}$ the translating devices $l$ are shown as connected in series or tension, and the regulator is placed in the main circuit, the current on which it is desired to maintain uniform.

Figure 6:
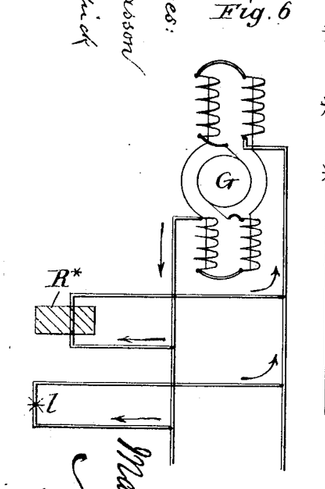
Figs. 6 to 11, diagrams illustrating different arrangements of circuits, electrical machines, and regulators, all of said arrangements embodying the invention or portions thereof.
Figure 7:
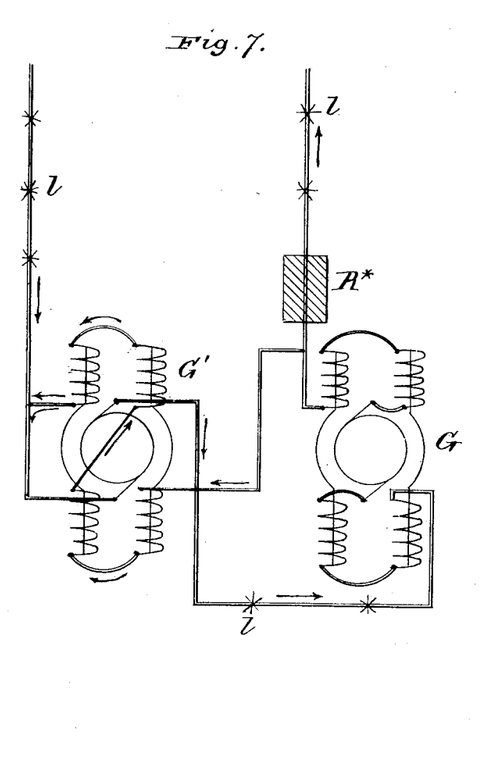
Figure 8:
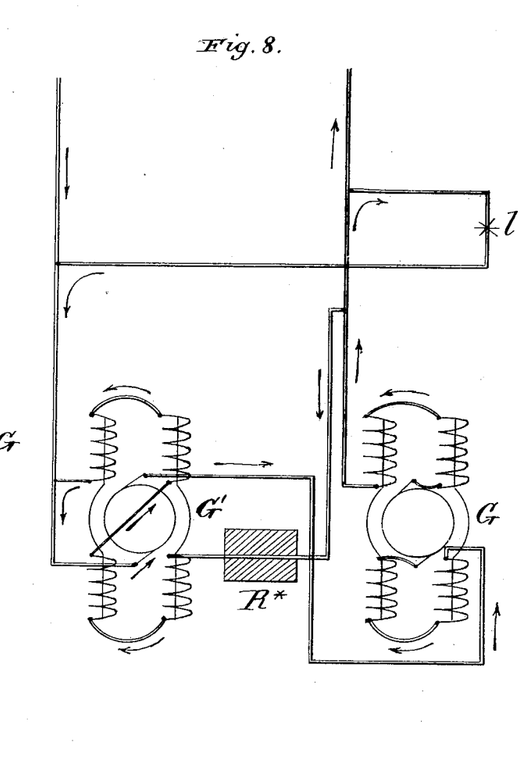

Fig. 6 represents the arrangement where the translating devices are connected in derivation or multiple arc. The regulator R$^{\times}$ is placed in a derived branch. The difference in potential between the direct and return wires is thus kept constant, and the devices are supplied uniformly, whatever the number in circuit. In all these arrangements the speed of the generator G varies with the number of translating devices in circuit, and the relation between the amount of electrical energy produced and the amount of mechanical energy expended in producing it is preserved only by great variations in the speed of the prime motor. These variations in speed have the inconvenience of diminishing the duty of the prime motor, which, whether a hydraulic, a gas, or a steam engine, operates most economically at that speed, or at approximately that speed, for which it is constructed. It is advantageous, therefore, to maintain the speed not absolutely constant, but within certain limits. The result is attained without the use of a ball-governor or similar speed-regulator, or other special cinematic apparatus, by disposing two generators and a current-regulator—such as before described with reference to Figs. 1 to 5—as shown in Fig. 7, if the translating devices are connected in series or tension, or, as shown in Fig. 8, if said devices are connected in derivation or multiple arc. In both figures, G G' are dynamo-electric machines excited, the one in a portion of the circuit in which the current is constant and wherein the regulator R$^{\times}$ is placed, and the other in a portion of the circuit wherein the current increases progressively with the number of translating devices in circuit.

In Fig. 7, in which the translating devices are arranged in series or in tension, the main circuit traverses the coils of the field-magnets and of the armature in the generator G, but the armature-coils only in the generator G', the field-magnets in said generator being in a derived branch. The armature-coils of the two generators are connected in tension. Assuming the apparatus to be running normally, it is obvious that the first effect of the introduction of additional translating devices into the circuit will be to increase the resistance of the main circuit, and thus to increase the current flowing through the field-magnets of generator G', and to diminish the current in the main circuit. The following effects then take place: The increase of current through the field-magnets of generator G' increases the electro-motive force, and the increase of electro-motive force causes an increased flow of current through the main circuit, as well as the derived branch. It is obvious, however, that these effects will not take place with the same expenditure of power, but that more steam must be taken by the engine. The regulator R$^{\times}$ supplies the demand for power by automatically opening the supply-valve of the engine. The final result is that the current in the main circuit again comes to its proper strength and the working of the apparatus proceeds normally, with the prime motor supplied with more steam, on account of the additional work to be performed, but without material change in the speed of the apparatus.

In Fig. 8, in which the translating devices are connected in derivation or in multiple arc, the generator or dynamo-electric machine G has both its field-magnets and armature included in the main circuit, while the generator or dynamo-machine G' has its armature included in the main circuit and its field-magnets included in a derived branch. As before, the armatures of the generators are connected in tension. The regulator $R^\times$ is placed in the derived branch, which includes the field-magnets of generator G'; or it may be in a special derivation, but preferably in the former, as shown. Assuming the operations to be proceeding normally in the system, the first effect of completing the circuit through additional translating devices will be to increase the number of derived branches, and thus to diminish the resistance of the circuit as a whole. The current through the field-magnets of generator G will therefore increase, and the electro-motive force of said generator will increase. The current through the regulator at the same time decreasing, the supply-valve of the prime motor will be opened and more steam will be supplied until the normal current passes through the regulator, when the working will continue under the normal conditions. It is easy to see that the current through the field-magnets of generator G will equal the sum of the currents through the derived branches, and will therefore increase progressively with the number of branches or translating devices in circuit, and cause a progressive increase in the electro-motive force sufficient to preserve the uniform flow of current through each device, notwithstanding the variations in the number in circuit, and without excessive change in the speed of the prime motor.

The electro-motive force of generator G in Fig. 7, and of G' in Fig. 8, although they are excited by the current generated, does not vary, or, at least, does not to a material extent, because they are excited in a portion of the circuit in which the current is maintained constant by the regulator. Each of these generators is therefore practically of constant electro-motive. The regulator, of course, is shifted only when variations in the current occur; but it is so sensitive and corrects the variation so quickly that the strength of the inductors or field-magnets of the generators is not affected materially, if at all.

Figures 9, 10, 11:
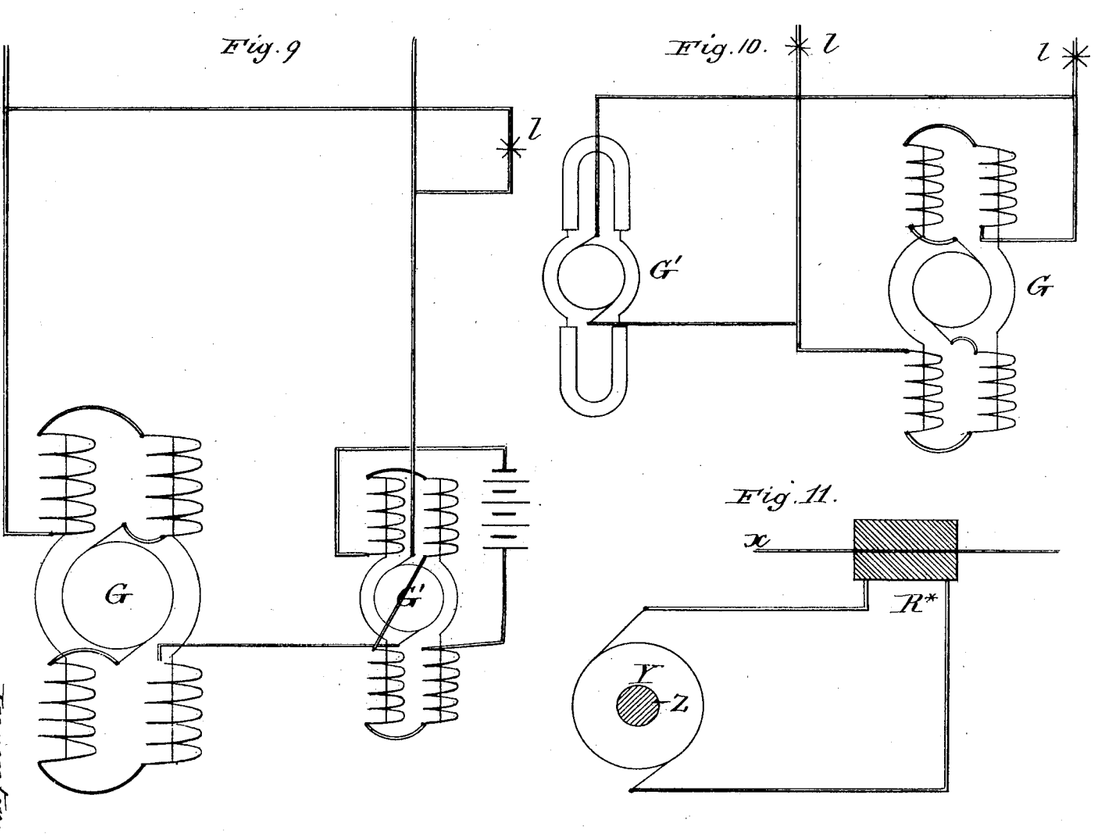

The dynamo-electric machines, particularly those of variable electro-motive force, (G' in Fig. 7 and G in Fig. 8,) should be of such size that the field is always far from saturation, since when saturation is approached the magnetism does not increase progressively with the current through the coils. It is obvious, also, that the machines are to be adapted in size, speed of rotation, and the like, to the special conditions of every case, which adaptation can be determined by a skilled electrician or electrical engineer. In both forms of arrangement, Figs. 7 and 8, the work performed is not measured by the velocity of the piston, as in the arrangements shown in Figs. 1 to $4^{bis}$, but by the mean pressure of fluid on the piston. It is possible, also, to dispense with the current-regulator, and, by using the ordinary speed-governor on the motor, to obtain a current approximately uniform through each translating device by using the arrangements before described. If, however, the current-regulator is dispensed with, it is evident that the electro-motive force of both generators is liable to fluctuate, whereas that of one of them should be constant. It is therefore advisable to use a magneto-generator or induction electric machine excited by permanent magnets, or electro-magnets excited from an exterior source, as the generator of constant electro-motive force. Figs. 9 and 10 show the arrangement with one dynamo-electric machine, G, and one magneto-electric machine, G'. In Fig. 9, the translating devices being arranged in derivation, the machines are connected in series or tension, and in Fig. 10, the translating devices being in series or tension, the generators are connected in derivation or multiple arc. No current-regulator is shown, since the prime motor is supposed to be controlled by a ball-governor or other non-electric speed-regulator; but a current-regulator—such as before indicated—could be employed, it being located in derivation in Fig. 9, or in the main circuit, Fig. 10.

By the use in the foregoing arrangements of resistances or other means for controlling the current independent of the prime motor the speed of the motor may be kept absolutely constant, and at the same time the current be kept uniform through the translating devices.

If a current-regulator controlling the supply of steam to an engine, as shown in Figs. 1 to $4^{bis}$, be placed in a circuit, or in a part of a circuit, wherein the current is uniform, with a uniform speed of an electrical machine, and varies with the speed, it is obvious that the said regulator will act as a speed-governor to the said machine, and to the prime motor operating the same. This, as has already been seen, is the case, at least approximately, in the arrangements represented in Figs. 7 and 8, and (when a current-regulator is used) in Figs. 9 and 10 also. The principle can be applied to regulating or maintaining uniform the speed of a prime motor for any purpose. This general application is illustrated in Fig. 11, where Z is the driving shaft of a prime motor, Y an electrical machine having its armature fixed on said shaft Z, or geared thereto, and $R^\times$ a current-regulator in the circuit of said machine. In this case the only variable quantity is the speed of the armature Y, and since variations in this will vary the current traversing the regulator, the latter will, by its control over the supply of steam to the prime motor, immediately correct any variations which may occur, and will maintain uniform the speed of the armature and of the prime motor. The advantage in this arrangement over the ordinary ball-governors is the greater sensitiveness of the electrical regulator and the closer approximation to absolute uniformity attained by its use. When the balls of an ordinary governor are thrown apart to diminish the supply of steam to the engine they do not usually resume their original position after the oscillations have ceased, but remain separated by a somewhat greater distance than before. The speed of the motor is therefore slightly accelerated, notwithstanding the action of the governor. Current-regulators of the type shown in Figs. 1 to 5, being in their nature independent of the position of the valve controlled thereby, check this small acceleration. Should the new regulators shown be for any purpose too sensitive, or respond too quickly to alterations of speed, their positive resistance can be increased by brakes, or similar means.

Modifications may be made in details of construction and arrangement without departing from the spirit of the invention, and parts thereof may be used separately. For example, old forms of current-regulators could be used in the systems shown in Figs. 7 to 10, and in Fig. 11.

Having now fully described my said invention and the manner of carrying the same into effect, what I claim is—

1. A regulator formed of two motors having their armatures mechanically connected and arranged in opposition, and electric circuits or connections, so that the one is balanced by the other only when excited by a current of normal strength, but overpowers the other, or is overpowered thereby, as the current rises above or falls below said normal strength, substantially as described.

2. The combination, in an electric regulator, of an electric motor and motor-shaft and counterbalancing mechanism, substantially as described, whereby the said motor is in equilibrium only when excited by a current of normal strength, and when so excited is balanced in all positions of the device controlled by said motor, as set forth.

3. The combination, with a prime motor, an electrical machine or machines driven by said motor, and a circuit supplied with electricity from said machines, of a regulator comprising an electric motor included in said circuit, or a branch thereof, and having its shaft mechanically connected with the regulating-valve of the prime motor and counterbalancing mechanism, substantially as described.

4. An electrical machine or machines excited partly in the main circuit and partly in a derived branch, in combination with an electric regulator excited in a portion of the circuit wherein the current is to be maintained uniform, substantially as described.

5. The combination, with an electric circuit and translating devices therein, of electrical machines, the one having inductors of constant or practically constant magnetism, and another having inductors whose magnetism varies with the number of translating devices in the circuit, substantially as described.

6. The combination, with an electric circuit having one or more branches, of a generator of constant or practically constant electromotive force, and a dynamo-electric machine whose electro-motive force varies with the demand, said machine being excited in a portion of said circuit in which, by the alterations of resistance in said circuit, the current increases or diminishes, substantially as described.

7. The combination of a prime motor and a speed-governor and an electrical circuit with two generators connected in tension or in multiple arc, according to the disposition of the translating devices in the circuit, the one of said generators being a dynamo-electric machine, the other a magneto-electric machine, or induction-machine having a sensibly-constant field, substantially as described.

8. The combination, with a prime motor, of an electric circuit, an electrical regulator included in said circuit, and controlling the supply of steam or motor-fluid to said prime motor, and an electrical machine, the whole arranged substantially as described, so that the electric regulator acts as a speed-governor and maintains uniform the speed of the prime motor, as set forth.

9. The combination, with an electric circuit, of a dynamo-electric machine excited in derivation, and a second machine excited in direct or main circuit, substantially as described.

10. The combination of an electric circuit having two or more branches, a prime motor, a dynamo-electric machine operated by said motor, and an electric regulator included in one of said branches, and controlling the supply of steam or other fluid to said motor, said machine being excited in that branch of the circuit which includes the regulator, so that the current in said branch being maintained uniform by said regulator the excitation of the machine is also kept constant, substantially as described.

In testimony whereof I have signed this specification in the presence of two subscribing witnesses.

MAURICE LEVY.

Witnesses:
 EUG. DUBOIS,
 LEON PECQUET.